United States Patent
Jiang

(10) Patent No.: US 11,246,070 B2
(45) Date of Patent: Feb. 8, 2022

(54) CELL CAMPING METHOD, AND USER EQUIPMENT

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 96 days.

(21) Appl. No.: 16/740,403

(22) Filed: Jan. 11, 2020

(65) Prior Publication Data

US 2020/0154325 A1    May 14, 2020

Related U.S. Application Data

(63) Continuation of application No. PCT/CN2017/093016, filed on Jul. 14, 2017.

(51) Int. Cl.
*H04W 36/00* (2009.01)
*H04W 48/16* (2009.01)

(52) U.S. Cl.
CPC ..... *H04W 36/00835* (2018.08); *H04W 48/16* (2013.01)

(58) Field of Classification Search
CPC .................. H04W 36/00835; H04W 48/16
USPC ......................................................... 370/331
See application file for complete search history.

(56) References Cited

U.S. PATENT DOCUMENTS

| 2011/0028120 | A1* | 2/2011 | Wu ................... | H04W 36/0022 455/404.1 |
| 2016/0029272 | A1* | 1/2016 | Ye ......................... | H04W 48/02 455/436 |
| 2017/0223757 | A1* | 8/2017 | Tsuboi ................ | H04W 76/20 |
| 2018/0098262 | A1* | 4/2018 | Chakraborty ......... | H04W 8/183 |

FOREIGN PATENT DOCUMENTS

| CN | 1516510 A | 7/2004 |
| CN | 101237689 A | 8/2008 |
| CN | 101651961 A | 2/2010 |
| CN | 102036317 A | 4/2011 |
| CN | 103686784 A | 3/2014 |
| CN | 106105356 A | 11/2016 |

OTHER PUBLICATIONS

Second office action of Chinese application No. 201780000774.6 dated Feb. 22, 2021.
3rd Generation Partnership Project; Technical Specification Group Radio Access Network; UE Procedures in Idle Mode and Procedures for Cell Reselection in Connected Mode, 3G TS 25.304 V3.3.0; Jun. 23, 2000, section 4.3.
First office action of Chinese application No. 201780000774.6 dated Aug. 3, 2020.

(Continued)

*Primary Examiner* — Faisal Choudhury
(74) *Attorney, Agent, or Firm* — Syncoda LLC; Feng Ma

(57) ABSTRACT

A cell camping method includes: when selecting a cell for camping, controlling an access stratum to determine, based on camping priorities of cells, a cell to be camped on, the camping priorities being related to service types that the cells provide; and performing a camping operation in the cell to be camped on.

16 Claims, 7 Drawing Sheets

(56) References Cited

OTHER PUBLICATIONS

3GPP, User Equipment (UE) procedures in idle mode; 3GPP TS 25.304 V14.0.0, Mar. 23, 2017, section 4.2-4.3, 5.2, figure 2.
Ericsson, Camping in NR; 3GPP TSG RAN WG2 NR-AH#2 Tdoc R2-1706636, Jun. 29, 2017, pp. 1-3.
International search report of PCT application No. PCT/CN2017/093016 dated Mar. 28, 2018.
Notification to grant patent right for invention of Chinese application No. 201780000774.6 dated Jun. 23, 2021.
Qualcomm Incorporated, TS 23.501: Mobility Restriction and non-3GPP access; SA WG2 Meeting #119 S2-170828; Feb. 6, 2017, pp. 1-3.
Qualcomm Incorporated, TS 23.501: System aspects of RRC_INACTIVE (closing editor notes); SA WG2 Meeting #S2-122 S2-175086; Jun. 30, 2017, pp. 1-7.

* cited by examiner

CELL CAMPING METHOD, AND USER EQUIPMENT

CROSS-REFERENCE TO RELATED APPLICATION

This application is a continuation of International Application No. PCT/CN2017/093016 filed on Jul. 14, 2017, the disclosure of which is hereby incorporated by reference in its entirety.

BACKGROUND

In a long-term evolution (LTE) system, a non-access stratum (NAS) of LTE supports service area restriction based on a forbidden area, where the service area restriction is defined as setting the forbidden area for providing a regional service.

An access stratum (AS) functions differently between a general forbidden area and the forbidden area for providing the regional service, where cells in the general forbidden area are regarded as unsuitable cells, whereas cells in the forbidden area for providing the regional service are regarded as suitable cells.

SUMMARY

The present disclosure relates generally to the field of communication technologies, and more specifically to a cell camping method, and a user equipment.

According to an aspect of the embodiments of the present disclosure, a cell camping method is provided. The method is applied to a UE, and includes:

when selecting a cell for camping, controlling an access stratum to determine, based on camping priorities of cells, a cell to be camped on, the camping priorities being related to service types that the cells provide; and performing a camping operation in the cell to be camped on.

In some embodiments, the camping priorities being related to service types that the cells provide includes the following cases: the camping priorities of suitable cells providing a restricted service are lower than the camping priorities of suitable cells providing a normal service; and the camping priorities of the suitable cells are higher than the camping priorities of acceptable cells.

In some embodiments, the controlling an access stratum to determine, based on camping priorities of cells, a cell to be camped on includes:

when the suitable cells providing the normal service exist among cells available for camping, determining a cell with a highest signal quality among the suitable cells providing the normal service as the cell to be camped on;

when the suitable cells providing the restricted service instead of the normal service exist among the cells available for camping, determining a cell with a highest signal quality among the suitable cells providing the restricted service as the cell to be camped on; and when no suitable cell exists among the cells available for camping, selecting a cell with a highest signal quality among the acceptable cells as the cell to be camped on.

In some embodiments, the controlling an access stratum determine, based on camping priorities of cells, a cell to be camped on includes:

when the suitable cells providing the normal service exist among the cells available for camping, determining a difference value between a highest signal quality corresponding to the suitable cells providing the restricted service and a highest signal quality corresponding to the suitable cells providing the normal service;

when the difference value is greater than a first strength threshold, determining a cell with the highest signal quality among the suitable cells providing the restricted service as the cell to be camped on; and when the difference value is not greater than the first strength threshold, determining a cell with a highest signal quality among the suitable cells providing the normal service as the cell to be camped on.

In some embodiments, the controlling an access stratum to determine, based on camping priorities of cells, a cell to be camped on includes:

determining a highest signal quality corresponding to the suitable cells providing the normal service;

when the highest signal quality corresponding to the suitable cells providing the normal service is higher than a second strength threshold, determining a cell with a highest signal quality among the suitable cells providing the normal service as the cell to be camped on;

when the highest signal quality corresponding to the suitable cells providing the normal service is not higher than the second strength threshold, determining a highest signal quality corresponding to the suitable cells providing the restricted service;

when the highest signal quality corresponding to the suitable cells providing the restricted service is higher than the second strength threshold, determining a cell with a highest signal quality among the suitable cells providing the restricted service as the cell to be camped on; and when the highest signal quality corresponding to the suitable cells providing the restricted service is not higher than the second strength threshold, determining a cell with a highest signal quality among the suitable cells providing the normal service as the cell to be camped on.

In some embodiments, the method further includes:

instructing a non-access stratum to record a non-allowed area in a forbidden area list, wherein the non-allowed area is an area in a service area in which the UE is not allowed to initiate a service request or a session management signaling and which is subjected to a service area restriction; and instructing the non-access stratum to send the forbidden area list to the access stratum.

In some embodiments, the method further includes:

determining, based on a suitable cell decision rule, whether cells in the non-allowed area are suitable cells, wherein the suitable cell decision rule does not include a rule that the cells in the non-allowed area belong to a forbidden area; and when it is determined that the cells in the non-allowed area are the suitable cells, marking the cells in the non-allowed area as the suitable cells providing the restricted service.

In some embodiments, the method further includes:

instructing a non-access stratum to establish an allowed area list or a non-allowed area list based on a service area restriction; and instructing the non-access stratum to send the allowed area list or the non-allowed area list to the access stratum.

In some embodiments, the method further includes:

determining cells in the non-allowed area based on the allowed area list or the non-allowed area list;

determining, based on a suitable cell decision rule, whether the cells in the non-allowed area are suitable cells, wherein the suitable cell decision rule does not include a rule that the cells in the non-allowed area belong to a forbidden area; and when it is determined that the cells in the non-allowed area are the suitable cells, marking the cells in the non-allowed area as the suitable cells providing the restricted service.

According to a second aspect of the embodiments of the present disclosure, a cell camping apparatus is provided. The apparatus is applied to a UE, and includes:

a first determining module, configured to, when selecting a cell for camping, control an access stratum to determine, based on camping priorities of cells, a cell to be camped on, the camping priorities being related to service types that the cells provide; and a camping module, configured to perform a camping operation in the cell to be camped on.

In some embodiments, the camping priorities being related to service types that the cells are able to provide includes the following cases: the camping priorities of suitable cells providing a restricted service are lower than the camping priorities of suitable cells providing a normal service; and the camping priorities of the suitable cells are higher than the camping priorities of acceptable cells.

In some embodiments, the first determining module includes:

a first determining submodule, configured to, when the suitable cells providing the normal service exist among cells available for camping, determine a cell with the highest signal quality among the suitable cells providing the normal service as the cell to be camped on;

a second determining submodule, configured to, when the suitable cells providing the restricted service instead of the normal service exist among the cells available for camping, determine a cell with the highest signal quality among the suitable cells providing the restricted service as the cell to be camped on; and a third determining submodule, configured to, when no suitable cell exists among the cells available for camping, select a cell with the highest signal quality among the acceptable cells as the cell to be camped on.

In some embodiments, the first determining module includes:

a fourth determination submodule, configured to, when the suitable cells providing the normal service exist among the cells available for camping, determine a difference value between a highest signal quality corresponding to the suitable cells providing the restricted service and a highest signal quality corresponding to the suitable cells providing the normal service;

a fifth determining submodule, configured to, when the difference value is higher than a first strength threshold, determine a cell with the highest signal quality among the suitable cells providing the restricted service as the cell to be camped on; and a sixth determining submodule, configured to, when the difference value is not higher than the first strength threshold, determine a cell with the highest signal quality among the suitable cells providing the normal service as the cell to be camped on.

In some embodiments, the first determining module includes:

a seventh determining submodule, configured to determine the highest signal quality corresponding to the suitable cells providing the normal service;

an eighth determining submodule, configured to, when the highest signal quality corresponding to the suitable cells providing the normal service as determined by the seventh determining submodule is higher than a second strength threshold, determine a cell with the highest signal quality among the suitable cells providing the normal service as the cell to be camped on;

a ninth determining submodule, configured to, when the highest signal quality corresponding to the suitable cells providing the normal service as determined by the seventh determining submodule is not higher than the second strength threshold, determine a highest signal quality corresponding to the suitable cells providing the restricted service;

a tenth determining submodule, configured to, when the highest signal quality corresponding to the suitable cells providing the restricted service as determined by the ninth determining submodule is higher than the second strength threshold, determine a cell with the highest signal quality among the suitable cells providing the restricted service as the cell to be camped on; and an eleventh determining submodule, configured to, when the highest signal quality corresponding to the suitable cells providing the restricted service as determined by the ninth determining submodule is not higher than the second strength threshold, determine a cell with the highest signal quality among the suitable cells providing the normal service as the cell to be camped on.

In some embodiments, the apparatus further includes:

a first instructing module, configured to instruct a non-access stratum to record a non-allowed area in a forbidden area list, wherein the non-allowed area is an area in the service area, in which the UE is not allowed to initiate a service request or a session management signaling and which is subjected to a service area restriction; and a second instructing module, configured to instruct the non-access stratum to send the forbidden area list generated by the first instructing module to the access stratum.

In some embodiments, the apparatus further includes:

a second determining module, configured to determine, based on a suitable cell decision rule, whether cells in the non-allowed area are suitable cells, wherein the suitable cell decision rule does not include a rule that the cells in the non-allowed area belong to a forbidden area; and a first marking module, configured to, when it is determined that the cells in the non-allowed area are the suitable cells, mark the cells in the non-allowed area as the suitable cells providing the restricted service.

In some embodiments, the apparatus further includes:

a third instructing module, configured to instruct a non-access stratum to establish an allowed area list or a non-allowed area list based on a service area restriction; and a fourth instructing module, configured to indicate the non-access stratum to send the allowed area list or the non-allowed area list as generated by the third instructing module to the access stratum.

In some embodiments, the apparatus further includes:

a third determining module, configured to determine cells in the non-allowed area based on the allowed area list or the non-allowed area list;

a fourth determining module, configured to determine, based on a suitable cell decision rule, whether the cells in the non-allowed area are suitable cells, wherein the suitable cell decision rule does not include a rule that the cells in the non-allowed area belong to a forbidden area; and a second marking module, configured to, when it is determined that the cells in the non-allowed area are the suitable cells, mark the cells in the non-allowed area as the suitable cells providing the restricted service.

According to another aspect of the embodiments of the present disclosure, a UE is provided. The UE includes:

a processor;

a memory configured to store instructions executable by the processor;

wherein the processor is configured to:

when selecting a cell for camping, control an access stratum to determine, based on camping priorities of cells, a cell to be camped on, the camping priorities being related to service types that the cells provide; and perform a camping operation in the cell to be camped on.

According to yet another aspect of the embodiments of the present disclosure, a non-transitory computer-readable storage medium is provided, on which computer instructions are stored, wherein the instructions are executed by a processor to perform the following steps:

when selecting a cell for camping, controlling an access stratum to determine, based on camping priorities of cells, a cell to be camped on, the camping priorities being related to service types that the cells provide; and performing a camping operation in the cell to be camped on.

It is to be understood that both the foregoing general description and the following detailed description are exemplary and explanatory only, and are not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Figure 1:
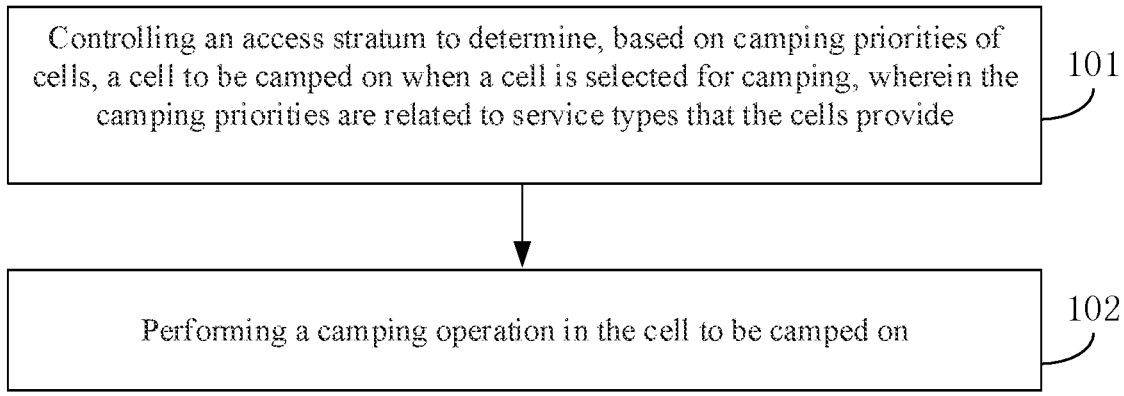
FIG. 1 is a flowchart of a cell camping method in accordance with an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

When performing a cell camping operation, the access stratum of a user equipment (UE) can select a cell to camp on based on the signal quality of the cell, which increases the risk that the UE camps on a suitable cell that may not provide a normal service. In the fifth-generation mobile communication technology (5G), the cell density becomes higher, the UE may identify and measure more cells, and with the related technologies, it is more likely to lead to the problem that the user equipment camps on a suitable cell that may not provide the normal service. In addition, the service area restriction in 5G is no longer implemented based on the forbidden area, and there is no solution available for implementing the AS support for the service area restriction in conventional technologies.

Various embodiments of the present disclosure provide a solution to implementing the AS support for the service area restriction with respect to a 5G system.

The technical solutions according to various embodiments of the present disclosure are applicable to a new generation network (such as the 5G network), in which the concept of service area restriction is introduced, where a service area is divided into an allowed area and a non-permitted area by a tracking area in a minimum unit. For the non-allowed area, the UE may not initiate a service request or session management signaling to the network; and for the allowed area, the UE is allowed to communicate with the network. Furthermore, in the 5G network, the method in the LTE network for dividing the services that a cell may provide into a restricted service (emergency call, earthquake and tsunami early warning, and commercial early warning), a normal service and an operator service may also be retained. Meanwhile, a cell may be classified as an acceptable cell, a suitable cell, a forbidden cell and an operator reserved cell. The acceptable cell only needs to meet a cell selection criterion and is not forbidden.

Whether a cell is a suitable cell may be determined based on a preset decision rule, which includes one or more of the following rules: the cell shall not be a forbidden cell or an operator reserved cell; the cell shall not belong to a forbidden area (where any communication with the network is forbidden); the cell shall have a registered public land mobile network (PLMN) or an equivalent PLMN; the cell shall have a closed subscriber group (CSG) as a CSG member of the UE; and the cell shall have a signal quality being greater than a certain threshold. A base station may send a suitable cell decision rule to the UE, such that the UE determines, based on the decision rule, which cells are suitable cells.

FIG. 1 is a flowchart of a cell camping method shown in accordance with an exemplary embodiment. The cell camping method may be applied to UE, and as shown in FIG. 1, include steps 101 to step 102 hereinafter.

In step 101, when a cell is selected for camping, an access stratum is controlled to determine, based on camping priorities of cells, a cell to be camped on, wherein the camping priorities are related to service types that the cells provide.

In some embodiments, the camping priorities are related to service types that each cell provides for the UE, wherein cells providing a normal service, for example, traffic data transmission and any other types of communication services, have the highest camping priority; and cells capable of providing a restricted service, such as emergency call, earthquake and tsunami early warning, and other types of services, have the camping priorities lower than the camping priorities of the suitable cells providing the normal service.

In some embodiments, the service types that the suitable cells may provide to the UE are generally more than the service types that the acceptable cells may provide to the UE, and therefore, the camping priorities of the suitable cells are higher than those of the acceptable cells.

In some embodiments, the access stratum may preferably camp on the cells with high camping priorities when selecting a cell for camping. For the method for determining a cell to be camped on, reference may be made to embodiments shown in FIGS. 2-4.

In step 102, a camping operation is performed in the cell to be camped on.

In some embodiments, after the cell to be camped on is determined, reference may be made to a cell camping solution in the related art for the method for performing the camping operation, and the details are not given herein any further.

With step 101 to step 102 in this embodiment, a cell to be camped on may be determined based on the camping priorities of cells, wherein the camping priorities are related to service types that the cells provide. For example, the camping priorities of the suitable cells capable of providing the normal service are higher than the camping priorities of the suitable cells capable of providing the restricted service. As such, the UE may be ensured to preferably camp on the suitable cell capable of providing the normal service, solving the problem that the related technologies tend to cause the UE to camp on the suitable cell that may not provide the normal service.

In some embodiments, the camping priorities being related to service types that the cells are able to provide includes the following cases: the camping priorities of suitable cells providing a restricted service are lower than the camping priorities of suitable cells providing a normal service; and the camping priorities of the suitable cells are higher than the camping priorities of acceptable cells.

In this embodiment, by setting the camping priorities of the suitable cells providing the normal service to be higher than the camping priorities of the suitable cells providing the restricted service, the UE may be allowed to preferably camp on a suitable cell providing the normal service; and moreover, by setting the camping priorities of the suitable cells to be higher than the camping priorities of the acceptable cells, the UE may be allowed to preferably camp on the suitable cell.

In some embodiments, the controlling an access stratum to determine, based on camping priorities of cells, a cell to be camped on includes:

when the suitable cells providing the normal service exist among cells available for camping, determining a cell with a highest signal quality among the suitable cells providing the normal service as the cell to be camped on;

when the suitable cells providing the restricted service instead of the normal service exist among the cells available for camping, determining a cell with a highest signal quality among the suitable cells providing the restricted service as the cell to be camped on; and when no suitable cell exists among the cells available for camping, selecting a cell with a highest signal quality among the acceptable cells as the cell to be camped on.

In this embodiment, a manner of preferably camping on a suitable cell is provided. In this manner, only the camping priority is taken as a reference factor for selecting a cell to be camped on when the signal quality of the cells meets a camping condition, thereby ensuring preferably camping on the suitable cell with a high camping priority.

In some embodiments, the controlling an access stratum to determine, based on camping priorities of cells, a cell to be camped on includes:

when the suitable cells providing the normal service exist among the cells available for camping, determining a difference value between a highest signal quality corresponding to the suitable cells providing the restricted service and a highest signal quality corresponding to the suitable cells providing the normal service;

when the difference value is greater than a first strength threshold, determining a cell with a highest signal quality among the suitable cells providing the restricted service as the cell to be camped on; and when the difference value is not greater than the first strength threshold, determining a cell with a highest signal quality among the suitable cells providing the normal service as the cell to be camped on.

In this embodiment, a manner of preferably camping on a suitable cell is provided. In this manner, when no great difference in signal quality is present between the cells providing the normal service and the cells providing the restricted service, camping on the cells providing the normal service is preferable, and when the difference is great, camping on the cells providing the restricted service is preferable. In this way, the cell to be camped on is determined by taking the camping priority and the signal quality into overall consideration. As such, the problem of poor wireless link quality that may be caused when the UE camps on the suitable cell with poor signal quality is prevented.

In some embodiments, the controlling an access stratum to determine, based on camping priorities of cells, a cell to be camped on includes:

determining a highest signal quality corresponding to the suitable cells providing the normal service;

when the highest signal quality corresponding to the suitable cells providing the normal service is higher than a second strength threshold, determining a cell with a highest signal quality among the suitable cells providing the normal service as the cell to be camped on;

when the highest signal quality corresponding to the suitable cells providing the normal service is not higher than the second strength threshold, determining a highest signal quality corresponding to the suitable cells providing the restricted service;

when the highest signal quality corresponding to the suitable cells providing the restricted service is higher than the second strength threshold, determining a cell with a highest signal quality among the suitable cells providing the restricted service as the cell to be camped on; and when the highest signal quality corresponding to the suitable cells providing the restricted service is not higher than the second strength threshold, determining a cell with a highest signal quality among the suitable cells providing the normal service as the cell to be camped on.

In this embodiment, a manner of preferably camping on a suitable cell is provided. In this manner, the cell to be camped on is determined by taking the camping priority and the signal quality into overall consideration, such that the UE is prevented from camping on the suitable cell with a poor signal quality.

In some embodiments, the cell camping method may further include:

instructing a non-access stratum to record a non-allowed area in a forbidden area list, wherein the non-allowed area is an area in the service area, in which the UE is not allowed to initiate a service request or a session management signaling and which is subjected to a service area restriction; and instructing the non-access stratum to send the forbidden area list to the access stratum.

In this embodiment, the non-access stratum indicates the non-allowed area of the access stratum through the forbidden area list. Since the forbidden area list already exists in the related art, the UE only needs to carry the non-allowed area in the forbidden area list, preventing the list maintenance and cost incurred by newly establishing the non-allowed area list.

In some embodiments, the cell camping method may further include:

determining, based on a suitable cell decision rule, whether cells in the non-allowed area are suitable cells, wherein the suitable cell decision rule does not include a rule that the cells in the non-allowed area belong to a forbidden area; and when it is determined that the cells in the non-allowed area are the suitable cells, marking the cells in the non-allowed area as the suitable cells providing the restricted service.

In this embodiment, during the determining whether the cells in the non-allowed area are suitable cells, the two concepts of the non-allowed area and the forbidden area are treated differently, and thus the non-allowed area and the forbidden area are distinguished at the level of camping priority when selecting a cell for camping.

In some embodiments, the cell camping method may further include:

instructing a non-access stratum to establish an allowed area list or a non-allowed area list based on a service area restriction; and instructing the non-access stratum to send the allowed area list or the non-allowed area list to the access stratum.

In this embodiment, the non-access stratum indicates the non-allowed area by means of the allowed area list or the non-allowed area list, which is more applicable to the next-generation network, such as the mechanism for separating the service area restriction from the forbidden area in the 5G network.

In some embodiments, the cell camping method may further include:

determining cells in the non-allowed area based on the allowed area list or the non-allowed area list;

determining, based on a suitable cell decision rule, whether the cells in the non-allowed area are suitable cells, wherein the suitable cell decision rule does not include a rule that the cells in the non-allowed area belong to the non-allowed area; and when it is determined that the cells in the non-allowed area are the suitable cells, marking the cells in the non-allowed area as the suitable cells providing the restricted service.

In this embodiment, whether the cells in the non-allowed area are suitable cells is determined only based on the suitable cell decision rule; and during the determining whether the cells in the non-allowed area are suitable cells, the suitable cells are determined as the cells providing the restricted service. In this way, the cells not supporting the service request in the non-allowed area are distinguished from the cells providing the normal service, such that the cells in the non-allowed area and the cells providing the normal service are distinguished at the level of camping priority when selecting a cell for camping.

For details on how to perform cell camping, reference may be made to the following embodiments.

To this end, with the method above according to the embodiments of the present disclosure, a cell to be camped on may be determined based on the camping priorities of cells, wherein the camping priorities are related to service types that the cells provide. For example, the camping priorities of the suitable cells capable of providing the normal service are higher than the camping priorities of the suitable cells capable of providing the restricted service. In this way, the UE may be ensured to preferably camp on the suitable cell capable of providing the normal service, such that the problem that the related technologies tend to cause the UE to camp on the suitable cell that may not provide the normal service is solved.

Some technical solutions according to various embodiments of the present disclosure are described below with respect to particular embodiments.

Figure 2:
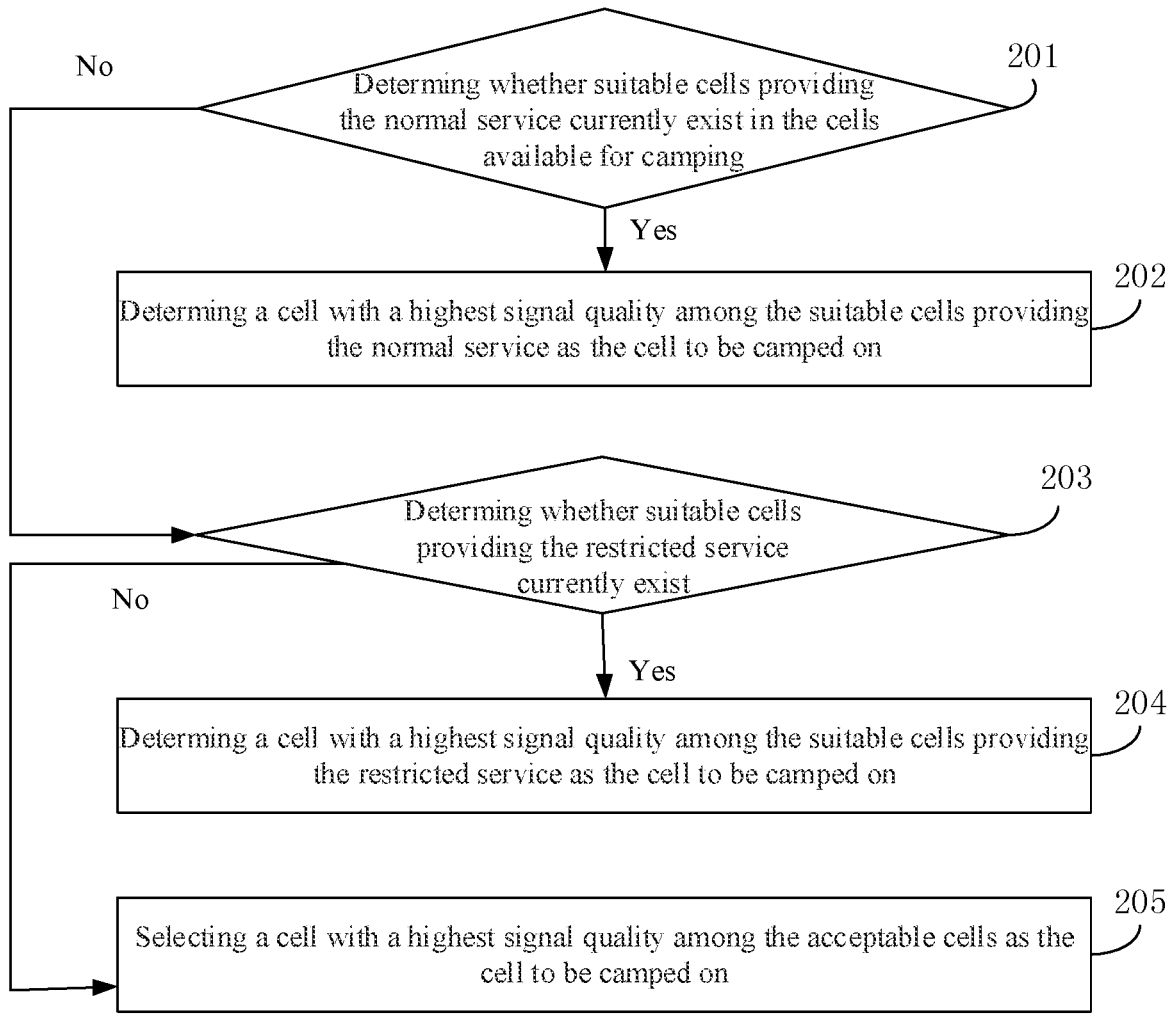
FIG. 2 is a flowchart of another cell camping method in accordance with an exemplary embodiment.

FIG. 2 is a flowchart of another cell camping method in accordance with an exemplary embodiment of the present disclosure. In this embodiment, the method according to this embodiment of the present disclosure is exemplified by determining a cell to be camped on by the UE, by way of example. As shown in FIG. 2, the method includes the following steps.

In step 201, whether suitable cells providing the normal service currently exist in the cells available for camping is determined; if the suitable cells providing the normal service exist currently, step 202 is performed; and if the suitable cells providing the normal service do not exist currently, step 203 is performed.

In some embodiments, the UE may determine, based on the suitable cell decision rule, which cells are suitable cells first, and then determine whether suitable cells providing the normal service exist among the suitable cells.

In step 202, a cell with a highest signal quality among the suitable cells providing the normal service is determined as the cell to be camped on.

In some embodiments, when two or more suitable cells providing the normal service are present, the cell with the highest signal quality is taken as the cell to be camped on; and in some embodiments, when one suitable cell providing the normal service is present, the suitable cell capable of providing the normal service is taken as the cell to be camped on.

In step 203, whether suitable cells providing the restricted service currently exist is determined; if the suitable cells providing the restricted service exist currently, step 204 is performed; and if the suitable cells providing the restricted service do not exist currently, step 205 is performed.

In step 204, a cell with a highest signal quality among the suitable cells providing the restricted service is determined as the cell to be camped on.

In step 205, a cell with a highest signal quality is selected among the acceptable cells as the cell to be camped on.

In this embodiment, a manner of preferably camping on a suitable cell is provided. In this manner, only the camping priority is taken as a reference factor for selecting a cell to be camped on when the signal quality of the cells meets a camping condition, thereby ensuring preferably camping on the suitable cell with a high camping priority.

Figure 3:
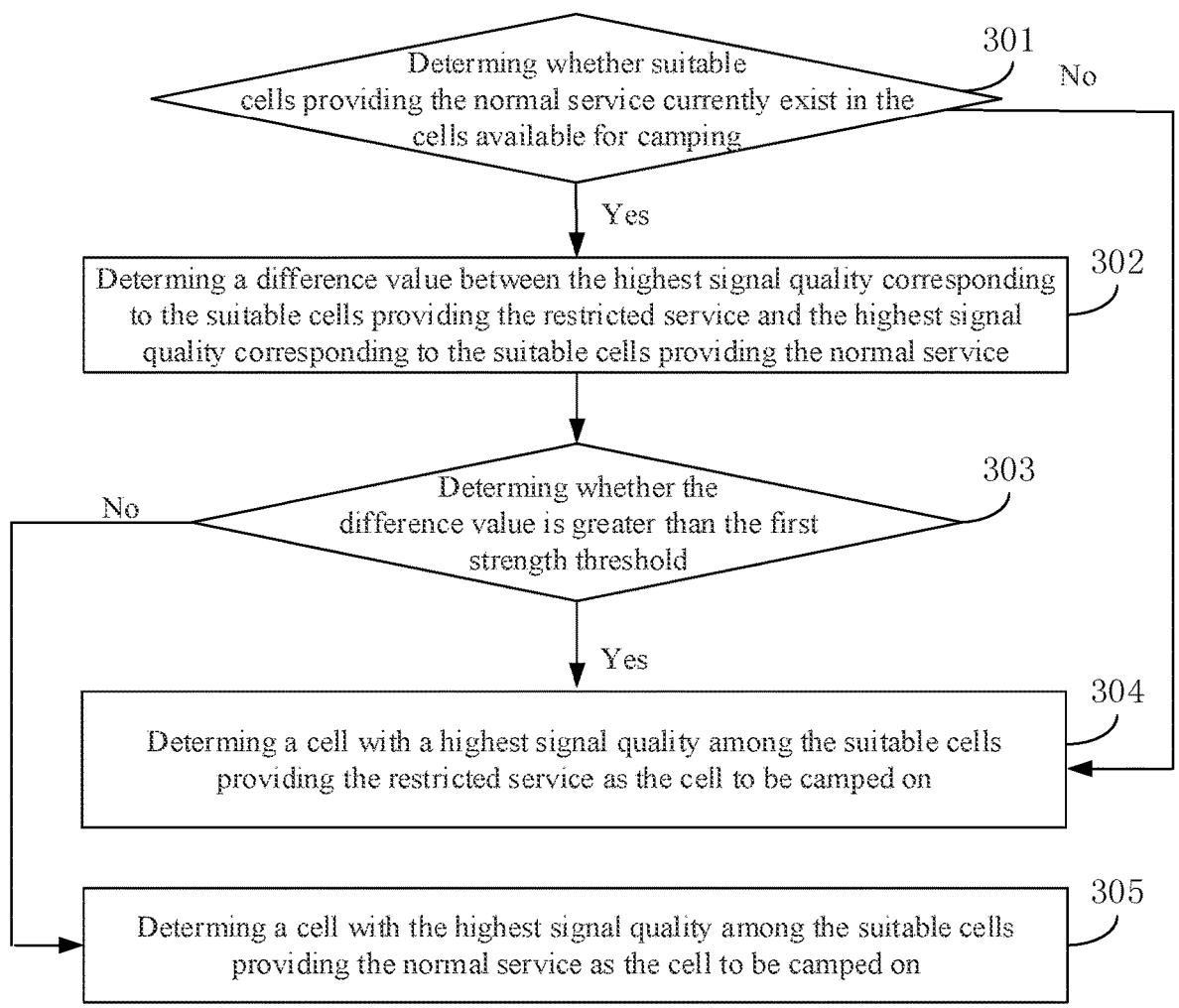
FIG. 3 is a flowchart of a further cell camping method in accordance with an exemplary embodiment.

FIG. 3 is a flowchart of a further cell camping method in accordance with an exemplary embodiment of the present disclosure. In this embodiment, the method according to this embodiment of the present disclosure is exemplified by how to determine a cell to be camped on, by way of example. As shown in FIG. 3, the method includes the following steps.

In step 301, whether suitable cells providing the normal service currently exist in the cells available for camping is determined; if the suitable cells providing the normal service exist currently, step 302 is performed; and if the suitable cells providing the normal service do not exist currently, step 304 is performed.

In some embodiments, the UE may determine, based on the suitable cell decision rule, which cells are suitable cells first, and then determine whether suitable cells providing the normal service exist among the suitable cells.

In step 302, a difference value between the highest signal quality corresponding to the suitable cells providing the restricted service and the highest signal quality corresponding to the suitable cells providing the normal service is determined.

In step 303, whether the difference value is greater than the first strength threshold is determined; if the difference value is greater than the first strength threshold, step 304 is performed; and if the difference value is not greater than the first strength threshold, step 305 is performed.

In some embodiments, the first strength threshold is to define that the difference in signal quality between the suitable cells providing the normal service and the suitable cell with the highest signal quality is not too great; and if the difference is great, the suitable cells providing the normal service are not taken as the suitable cells to be camped on preferably.

In step 304, a cell with a highest signal quality among the suitable cells providing the restricted service is determined as the cell to be camped on.

In step 305, a cell with the highest signal quality among the suitable cells providing the normal service is determined as the cell to be camped on.

In this embodiment, another manner of preferably camping on a suitable cell is provided. In this manner, when no great difference in signal quality is present between the cells providing the normal service and the cells providing the restricted service, camping on the cells providing the normal service is preferable, and when the difference is great, camping on the cells providing the restricted service is preferable. In this way, the cell to be camped on is determined by taking the camping priority and the signal quality into overall consideration, such that the problem of a poor wireless link quality that may be caused when the UE camps on the suitable cell with poor signal quality is prevented.

Figure 4:
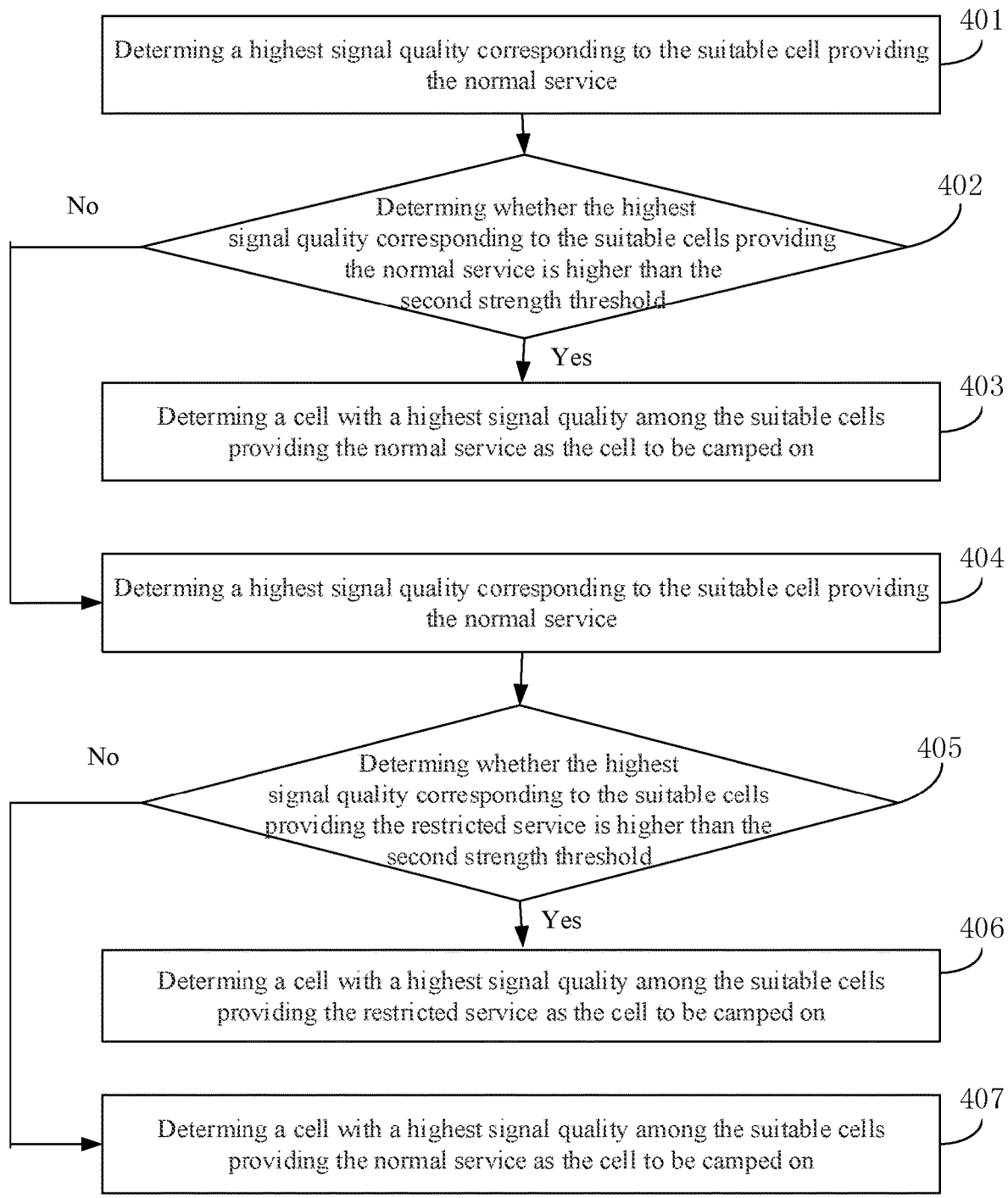
FIG. 4 is a flowchart of a further another cell camping method in accordance with an exemplary embodiment.

FIG. 4 is a flowchart of a further another cell camping method in accordance with an exemplary embodiment of the present disclosure. In this embodiment, the method according to this embodiment of the present disclosure is exemplified by how to determine a cell to be camped on by the UE, by way of example. As shown in FIG. 4, the method includes the following steps.

In step 401, a highest signal quality corresponding to the suitable cell providing the normal service is determined.

In step 402, whether the highest signal quality corresponding to the suitable cells providing the normal service is higher than the second strength threshold is determined; if the highest signal quality is higher than the second strength threshold, step 403 is performed; and if the highest signal quality is not higher than the second strength threshold, step 404 is performed.

In some embodiments, the second strength threshold may be a small value, such as −80 dB, in order to avoid preferably camping on the suitable cell providing the normal service even when the suitable cells providing the normal service have a poor signal quality.

In step 403, a cell with a highest signal quality among the suitable cells providing the normal service is determined as the cell to be camped on.

In step 404, a highest signal quality corresponding to the suitable cell providing the normal service is determined.

In step 405, whether the highest signal quality corresponding to the suitable cells providing the restricted service is higher than the second strength threshold is determined; if the highest signal quality is higher than the second strength threshold, step 406 is performed; and if the highest signal quality is not higher than the second strength threshold, step 407 is performed.

In step 406, a cell with a highest signal quality among the suitable cells providing the restricted service is determined as the cell to be camped on.

In step 407, a cell with a highest signal quality among the suitable cells providing the normal service is determined as the cell to be camped on.

In this embodiment, another manner of preferably camping on a suitable cell is provided. In this manner, the cell to be camped on is determined by taking the camping priority and the signal quality into overall consideration, such that the UE is prevented from camping on the suitable cell with a poor signal quality.

Figure 5:
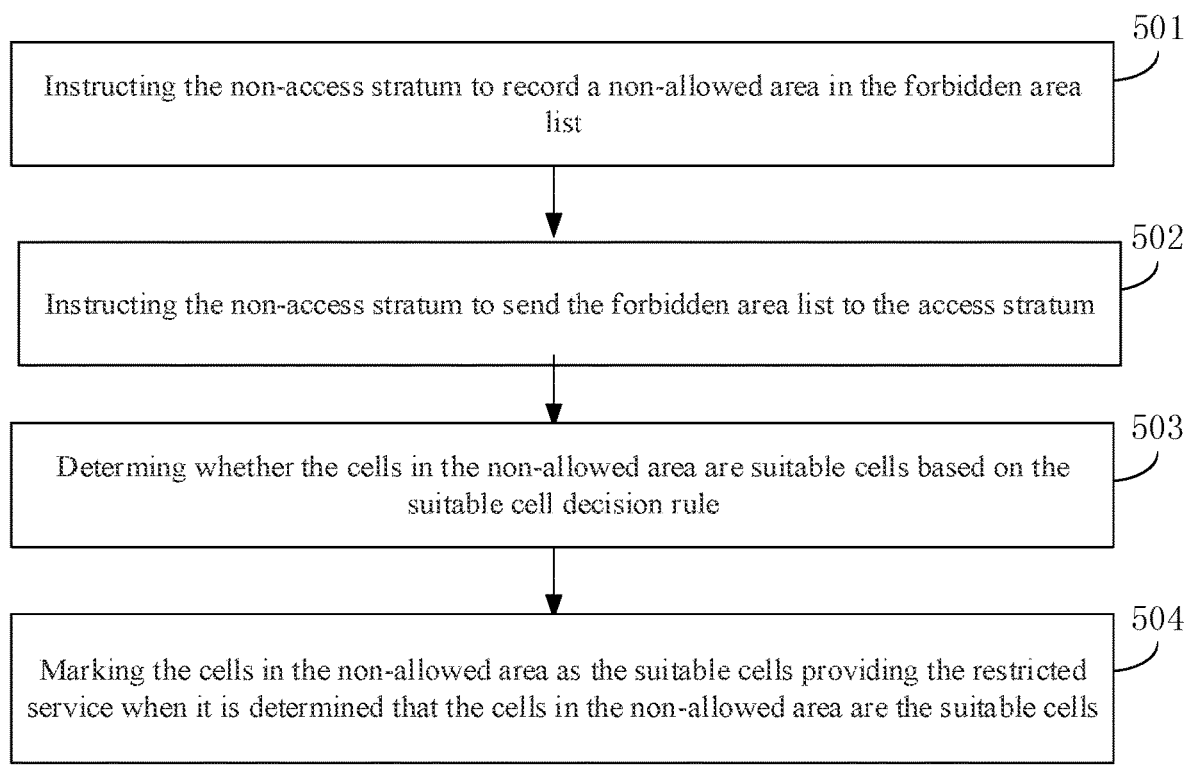
FIG. 5 is a flowchart of a further another cell camping method in accordance with an exemplary embodiment.

FIG. 5 is a flowchart of a further another cell camping method in accordance with an exemplary embodiment of the present disclosure. In this embodiment, the method according to this embodiment of the present disclosure is exemplified by how to indicate the non-allowed area subjected to the service area restriction to the access stratum by the non-access stratum in the UE and how to determine whether the cells in the non-allowed area are suitable cells by the access stratum, by way example. As shown in FIG. 5, the method includes the following steps.

In step 501, the non-access stratum is instructed to record a non-allowed area in the forbidden area list.

In some embodiments, the forbidden area list records cells in a forbidden area and cells in a non-allowed area; and the non-allowed area is an area in the service area, in which the UE is not allowed to initiate a service request or a session management signaling and which is subjected to a service area restriction.

In step 502, the non-access stratum is instructed to send the forbidden area list to the access stratum.

In step 503, whether the cells in the non-allowed area are suitable cells is determined based on the suitable cell decision rule.

In some embodiments, during the determining whether the cells in the non-allowed area are suitable cells, one of decision conditions is that the cells in the non-allowed area are not allowed to belong to the forbidden area.

In step 504, when it is determined that the cells in the non-allowed area are the suitable cells, the cells in the non-allowed area are marked as the suitable cells providing the restricted service.

In this embodiment, the non-access stratum indicates the non-allowed area of the access stratum through the forbidden area list. Since the forbidden area list already exists in the related art, the UE only needs to carry the non-allowed area in the forbidden area list, thereby preventing the list maintenance and cost incurred by newly establishing the non-allowed area list. In addition, during the determining whether the cells in the non-allowed area are suitable cells, the two concepts of the non-allowed area and the forbidden area are treated differently, such that the non-allowed area and the forbidden area are distinguished at the level of camping priority when selecting a cell for camping.

Figure 6:
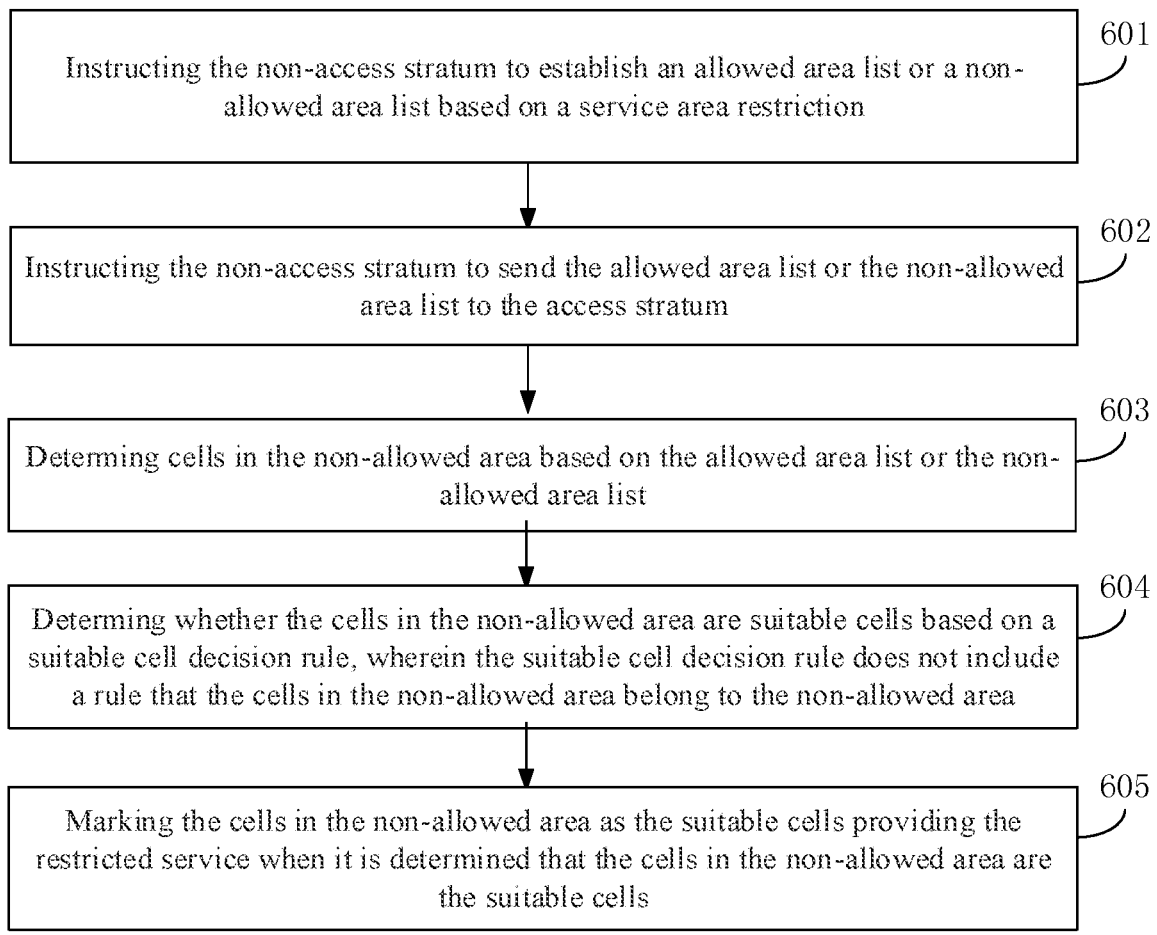
FIG. 6 is a flowchart of a further another cell camping method in accordance with an exemplary embodiment.

FIG. 6 is a flowchart of a further another cell camping method in accordance with an exemplary embodiment of the present disclosure, which is exemplified by how to indicate the non-allowed area subjected to the service area restriction to the access stratum by the non-access stratum in the UE and how to determine whether the cells in the non-allowed area are suitable cells by the access stratum, by way example. As shown in FIG. 6, the method includes the following steps.

In step 601, the non-access stratum is instructed to establish an allowed area list or a non-allowed area list based on a service area restriction.

In some embodiments, the allowed area list may record the allowed area subjected to the service area restriction, and oppositely, the cells subjected to the service area restriction which are not recorded in the allowed area list are in the non-allowed area.

In step 602, the non-access stratum is instructed to send the allowed area list or the non-allowed area list to the access stratum.

In step 603, cells in the non-allowed area are determined based on the allowed area list or the non-allowed area list.

In some embodiments, if the access stratum receives the allowed area list, the cells in a serviceable area, except for the cells allowed to be recorded in the allowed area list, are those in the non-allowed area; and in some embodiments, if the access stratum receives the non-allowed area list, it may be determined that the cells recorded in the non-allowed area list are those in the non-allowed area.

In step 604, whether the cells in the non-allowed area are suitable cells is determined based on a suitable cell decision rule, wherein the suitable cell decision rule does not include a rule that the cells in the non-allowed area belong to the non-allowed area.

In some embodiments, the suitable cell decision rule does not include that cells belong to the allowed area or the non-allowed area.

In step 605, when it is determined that the cells in the non-allowed area are the suitable cells, the cells in the non-allowed area are marked as the suitable cells providing the restricted service.

In this embodiment, the non-access stratum indicates the non-allowed area by means of the allowed area list or the non-allowed area list, which is more applicable to the next-generation network, such as the mechanism for separating the service area restriction from the forbidden area in the 5G network. In addition, whether the cells in the non-allowed area are suitable cells is determined only based on the suitable cell decision rule; and during the determining whether the cells in the non-allowed area are suitable cells, the suitable cells are determined as the cells providing the restricted service. In this way, the cells not supporting the service request in the non-allowed area are distinguished from the cells providing the normal service, such that the cells in the non-allowed area and the cells providing the normal service are distinguished at the level of camping priority when selecting a cell for camping.

Figure 7:
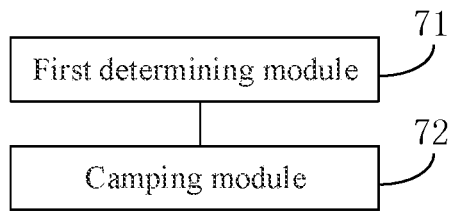
FIG. 7 is a block diagram of a cell camping apparatus in accordance with an exemplary embodiment.

FIG. 7 is a block diagram of a cell camping apparatus in accordance with an exemplary embodiment. As shown in FIG. 7, the cell camping apparatus includes:

a first determining module 71, configured to, when selecting a cell for camping, control an access stratum to determine, based on camping priorities of cells, a cell to be camped on, the camping priorities being related to service types that the cells provide; and a camping module 72, configured to perform a camping operation in the cell to be camped on.

In this embodiment, the UE may be ensured to preferably camp on a suitable cell capable of providing the normal service, thereby solving the problem that relevant technologies tend to cause the UE to camp on a suitable cell that may not provide the normal service.

Figure 8:
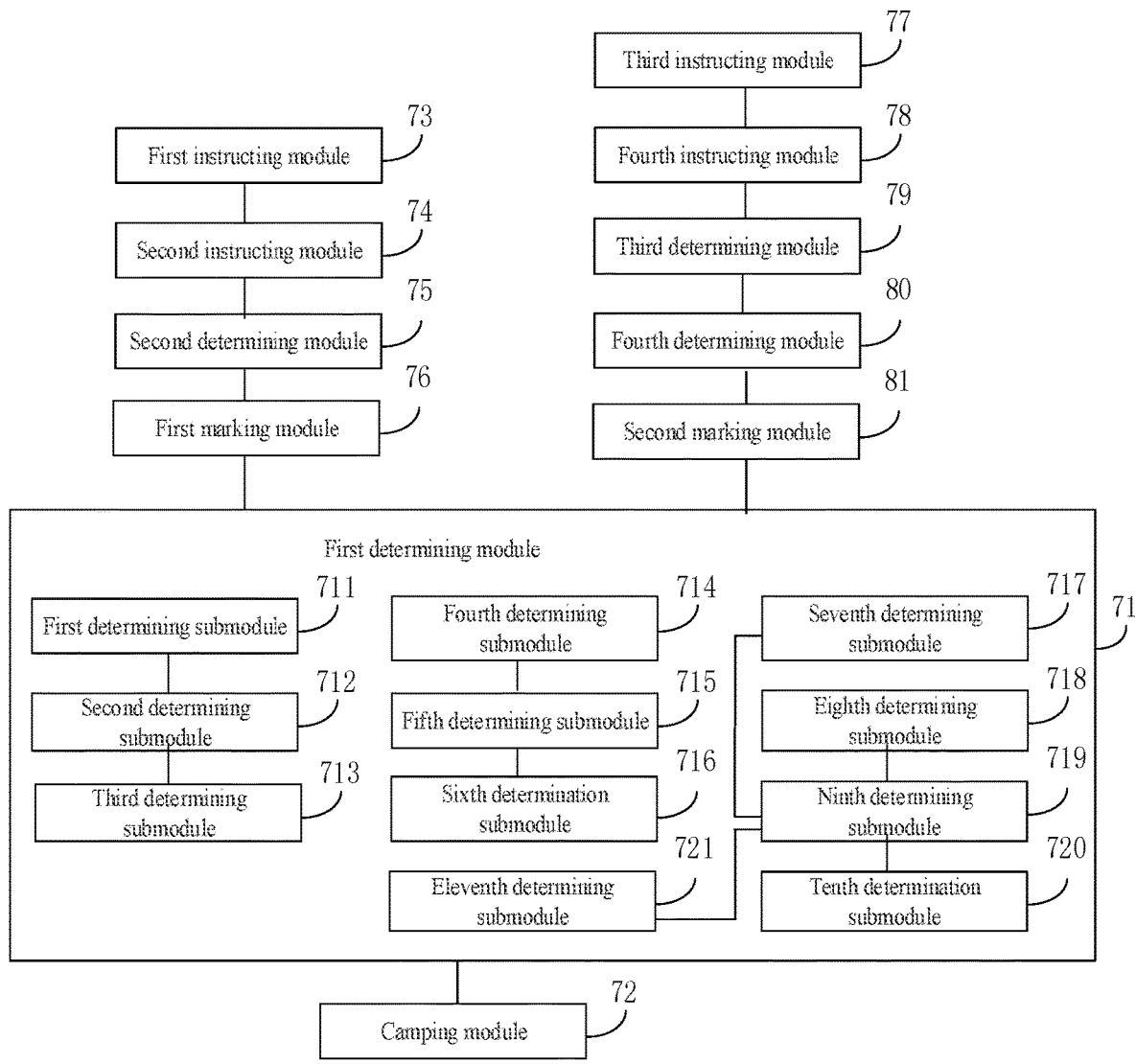
FIG. 8 is a block diagram of another cell camping apparatus in accordance with an exemplary embodiment.

FIG. 8 is a block diagram of another cell camping apparatus in accordance with an exemplary embodiment. As shown in FIG. 8, in some embodiments based on the embodiment shown in FIG. 8, the camping priorities being related to service types that the cells are able to provide includes the following cases: the camping priorities of suitable cells providing a restricted service are lower than the camping priorities of suitable cells providing a normal service; and the camping priorities of the suitable cells are higher than the camping priorities of acceptable cells.

In this embodiment, by setting the camping priorities of the suitable cells providing the normal service to be higher than the camping priorities of the suitable cells providing the restricted service, the UE may be allowed to preferably camp on a suitable cell providing the normal service; and moreover, by setting the camping priorities of the suitable cells to be higher than the camping priorities of the acceptable cells, the UE may be allowed to preferably camp on the suitable cell.

In some embodiments, the first determining module 71 includes:

a first determining submodule 711, configured to, when the suitable cells providing the normal service exist among cells available for camping, determine a cell with a highest signal quality among the suitable cells providing the normal service as the cell to be camped on;

a second determining submodule 712, configured to, when the suitable cells providing the restricted service instead of the normal service exist among the cells available for camping, determine a cell with a highest signal quality among the suitable cells providing the restricted service as the cell to be camped on; and a third determining submodule 713, configured to, when no suitable cell exists among the cells available for camping, select a cell with the highest signal quality among the acceptable cells as the cell to be camped on.

In this embodiment, a manner of preferably camping on a suitable cell is provided. In this manner, only the camping priority is taken as a reference factor for selecting a cell to be camped on when the signal quality of the cells meets a camping condition, thereby ensuring preferably camping on the suitable cell with a high camping priority.

In some embodiments, the first determining module 71 includes:

a fourth determining submodule 714, configured to, when the suitable cells providing the normal service exist among the cells available for camping, determine a difference value between a highest signal quality corresponding to the suitable cells providing the restricted service and a highest signal quality corresponding to the suitable cells providing the normal service;

a fifth determining submodule 715, configured to, when the difference value is greater than a first strength threshold, determine a cell with a highest signal quality among the suitable cells providing the restricted service as the cell to be camped on; and a sixth determination submodule 716, configured to, when the difference value is not greater than the first strength threshold, determine a cell with a highest signal quality among the suitable cells providing the normal service as the cell to be camped on.

In this embodiment, another manner of preferably camping on a suitable cell is provided. In this manner, when no great difference in signal quality is present between the cells providing the normal service and the cells providing the restricted service, camping on the cells providing the normal service is preferable, and when the difference is great, camping on the cells providing the restricted service is preferable. In this way, the cell to be camped on is determined by taking the camping priority and the signal quality into overall consideration, such that the problem of a poor wireless link quality that may be caused when the UE camps on the suitable cell with poor signal quality is prevented.

In some embodiments, the first determining module 71 includes:

a seventh determining submodule 717, configured to determine a highest signal quality corresponding to the suitable cells providing the normal service;

an eighth determining submodule 718, configured to, when the highest signal quality corresponding to the suitable cells providing the normal service as determined by the seventh determining submodule 717 is higher than a second strength threshold, determine a cell with a highest signal quality among the suitable cells providing the normal service as the cell to be camped on;

a ninth determining submodule 719, configured to, when the highest signal quality corresponding to the suitable cells providing the normal service as determined by the seventh determining submodule 717 is not higher than the second strength threshold, determine a highest signal quality corresponding to the suitable cells providing the restricted service;

a tenth determination submodule 720, configured to, when the highest signal quality corresponding to the suitable cells providing the restricted service as determined by the ninth determining submodule 719 is higher than the second strength threshold, determine a cell with a highest signal quality among the suitable cells providing the restricted service as the cell to be camped on; and an eleventh determining submodule 721, configured to, when the highest signal quality corresponding to the suitable cells providing the restricted service as determined by the ninth determining submodule 719 is not higher than the second strength threshold, determine a cell with a highest signal quality among the suitable cells providing the normal service as the cell to be camped on.

In this embodiment, another manner of preferably camping on a suitable cell is provided. In this manner, the cell to be camped on is determined by taking the camping priority and the signal quality into overall consideration, such that the UE is prevented from camping on the suitable cell with a poor signal quality.

In some embodiments, the apparatus further includes:

a first instructing module 73, configured to instruct a non-access stratum to record a non-allowed area in a forbidden area list, wherein the non-allowed area is an area in the service area, in which the UE is not allowed to initiate a service request or a session management signaling and which is subjected to a service area restriction; and a second instructing module 74, configured to instruct the non-access stratum to send the forbidden area list generated by the first instructing module to the access stratum.

In this embodiment, the non-access stratum indicates the non-allowed area of the access stratum through the forbidden area list. Since the forbidden area list already exists in the related art, the UE only needs to carry the non-allowed area in the forbidden area list, thereby preventing the list maintenance and cost incurred by newly establishing the non-allowed area list.

In some embodiments, the apparatus further includes:

a second determining module 75, configured to determine, based on a suitable cell decision rule, whether cells in the non-allowed area are suitable cells, wherein the suitable cell decision rule does not include a rule that the cells in the non-allowed area belong to a forbidden area; and a first marking module 76, configured to, when it is determined that the cells in the non-allowed area are the suitable cells, mark the cells in the non-allowed area as the suitable cells providing the restricted service.

In this embodiment, during the determining whether the cells in the non-allowed area are suitable cells, the two concepts of the non-allowed area and the forbidden area are treated differently, and thus the non-allowed area and the forbidden area are distinguished at the level of camping priority when selecting a cell for camping.

In some embodiments, the apparatus further includes:

a third instructing module 77, configured to instruct a non-access stratum to establish an allowed area list or a non-allowed area list based on a service area restriction; and a fourth instructing module 78, configured to instruct the non-access stratum to send the allowed area list or the non-allowed area list as generated by the third instructing module to the access stratum.

In this embodiment, the non-access stratum indicates the non-allowed area by means of the allowed area list or the non-allowed area list, which is more applicable to the next-generation network, such as the mechanism for separating the service area restriction from the forbidden area in the 5G network.

In some embodiments, the apparatus further includes:

a third determining module 79, configured to determine cells in the non-allowed area based on the allowed area list or the non-allowed area list;

a fourth determining module 80, configured to determine, based on a suitable cell decision rule, whether the cells in the non-allowed area are suitable cells, wherein the suitable cell decision rule does not include a rule that the cells in the non-allowed area belong to the non-allowed area; and a second marking module 81, configured to, when it is determined that the cells in the non-allowed area are the suitable cells, mark the cells in the non-allowed area as the suitable cells providing the restricted service.

In this embodiment, whether the cells in the non-allowed area are suitable cells is determined only based on the suitable cell decision rule. During the determining whether the cells in the non-allowed area are suitable cells, the suitable cells are determined as the cells providing the restricted service. In this way, the cells not supporting the service request in the non-allowed area are distinguished from the cells providing the normal service, such that the cells in the non-allowed area and the cells providing the normal service are distinguished at the level of camping priority when selecting a cell for camping.

Figure 9:
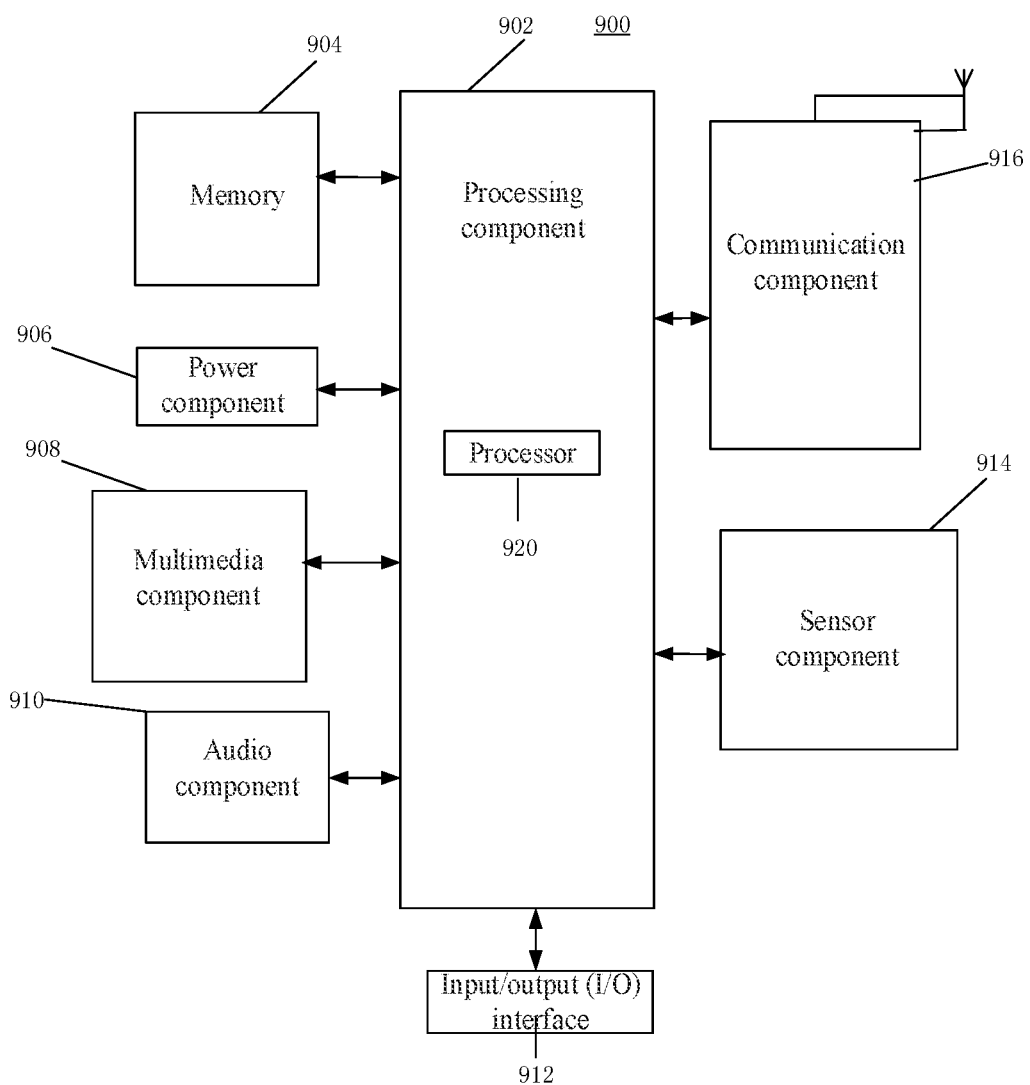
FIG. 9 is a block diagram of an apparatus suitable for cell camping in accordance with an exemplary embodiment.

FIG. 9 is a block diagram of an apparatus suitable for cell camping in accordance with an exemplary embodiment. For example, the apparatus 900 may be a mobile phone, a computer, a digital broadcast terminal, a messaging device, a gaming console, a tablet device, a medical device, a fitness equipment, a personal digital assistant, or the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the apparatus 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, videos, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). In some embodiments, OLED (organic light emitting diode) displays or other types of monitors can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 908 includes a front camera and/or a rear camera. The front camera and the rear camera may receive external multimedia data while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive external audio signals when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, such as a keyboard, a click wheel, buttons, and the like. The buttons may include, but are not limited to, a home button, a volume button, a start button, and a lock button.

The sensor component 914 includes one or more sensors to provide status assessments of various aspects of the apparatus 900. For instance, the sensor component 914 may detect an on/off status of the apparatus 900, relative positioning of components, e.g., the display device and the mini keyboard of the apparatus 900, and the sensor component 914 may also detect a position change of the apparatus 900 or a component of the apparatus 900, presence or absence of user contact with the apparatus 900, orientation or acceleration/deceleration of the apparatus 900, and temperature change of the apparatus 900. The sensor component 914 may include a proximity sensor configured to detect the presence of nearby objects without any physical contact. The sensor component 914 may also include a light sensor, such as a CMOS or CCD image sensor, used for imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 may access a wireless network based on a communication standard, such as Wi-Fi, 2G, 3G, 4G, or 5G, or a combination thereof. In an exemplary embodiment, the communication component 916 receives broadcast signals or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, there is further provided a non-transitory computer readable storage medium including instructions, for example, a memory 904 including instructions. When the instructions above are executed, a processor 920 of the apparatus 900 may be configured to execute the method described in the first aspect, which includes: when selecting a cell for camping, controlling an access stratum to determine, based on camping priorities of cells, a cell to be camped on, the camping priorities being related to service types that the cells provide; and performing a camping operation in the cell to be camped on.

In some embodiments, the non-transitory computer readable storage medium may be a ROM, a random-access memory (RAM), a CD-ROM, a magnetic tape, a floppy disk, an optical data storage device and the like.

Various embodiments of the present disclosure can have one or more of the following advantages.

When selecting a cell for camping, the UE may determine, based on the camping priorities of cells, a cell to be camped on. The camping priorities are related to service types that the cells provide. For example, the camping priorities of suitable cells capable of providing a normal service are higher than the camping priorities of suitable cells capable of providing a restricted service. Thus, the UE may be ensured to preferably camp on the suitable cell capable of providing the normal service, solving the problem that the related technologies tend to cause the UE to camp on the suitable cell that may not provide the normal service.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A cell camping method, the method being applied to a user equipment, and comprising:
   when selecting a cell for camping, controlling an access stratum to determine, based on camping priorities of cells, a cell to be camped on, the camping priorities being related to service types that the cells provide; and
   performing a camping operation in the cell to be camped on,
   wherein the camping priorities being related to service types that the cells are able to provide comprises:
   the camping priorities of suitable cells providing a restricted service are lower than the camping priorities of suitable cells providing a normal service; and
   the camping priorities of suitable cells are higher than the camping priorities of acceptable cells, and
   wherein the controlling an access stratum to determine, based on camping priorities of cells, a cell to be camped on, comprises:
   when the suitable cells providing the normal service exist among the cells available for camping, determining a difference value between a highest signal quality corresponding to the suitable cells providing the restricted service and a highest signal quality corresponding to the suitable cells providing the normal service;
   when the difference value is greater than a first strength threshold, determining a cell with the highest signal quality among the suitable cells providing the restricted service as the cell to be camped on; and
   when the difference value is not greater than the first strength threshold, determining a cell with the highest signal quality among the suitable cells providing the normal service as the cell to be camped on.

2. The method according to claim 1, wherein the controlling an access stratum to determine, based on camping priorities of cells, a cell to be camped on, comprises:
   when the suitable cells providing the normal service exist among cells available for camping, determining a cell with a highest signal quality among the suitable cells providing the normal service as the cell to be camped on;
   when the suitable cells providing the restricted service instead of the normal service exist among the cells available for camping, determining a cell with a highest signal quality among the suitable cells providing the restricted service as the cell to be camped on; and
   when no suitable cell exists among the cells available for camping, selecting a cell with a highest signal quality among the acceptable cells as the cell to be camped on.

3. The method according to claim 1, wherein the controlling an access stratum to determine, based on camping priorities of cells, a cell to be camped on, comprises:
   determining a highest signal quality corresponding to the suitable cells providing the normal service;
   when the highest signal quality corresponding to the suitable cells providing the normal service is higher than a second strength threshold, determining a cell with a highest signal quality among the suitable cells providing the normal service as the cell to be camped on;
   when the highest signal quality corresponding to the suitable cells providing the normal service is not higher than the second strength threshold, determining a highest signal quality corresponding to the suitable cells providing the restricted service;
   when the highest signal quality corresponding to the suitable cells providing the restricted service is higher than the second strength threshold, determining a cell with a highest signal quality among the suitable cells providing the restricted service as the cell to be camped on; and
   when the highest signal quality corresponding to the suitable cells providing the restricted service is not higher than the second strength threshold, determining a cell with a highest signal quality among the suitable cells providing the normal service as the cell to be camped on.

4. The method according to claim 1, further comprising:
   instructing a non-access stratum to record a non-allowed area in a forbidden area list, wherein the non-allowed area is an area in a service area in which the user equipment is not allowed to initiate a service request or a session management signaling and which is subjected to a service area restriction; and
   instructing the non-access stratum to send the forbidden area list to the access stratum.

5. The method according to claim 4, further comprising:
   determining, based on a suitable cell decision rule, whether cells in the non-allowed area are suitable cells, wherein the suitable cell decision rule does not comprise a rule that the cells in the non-allowed area belong to a forbidden area; and
   when it is determined that the cells in the non-allowed area are the suitable cells, marking the cells in the non-allowed area as the suitable cells providing the restricted service.

6. The method according to claim 1, further comprising:
   instructing a non-access stratum to establish an allowed area list or a non-allowed area list based on a service area restriction; and
   instructing the non-access stratum to send the allowed area list or the non-allowed area list to the access stratum.

7. The method according to claim 6, further comprising:
   determining cells in the non-allowed area based on the allowed area list or the non-allowed area list;
   determining, based on a suitable cell decision rule, whether the cells in the non-allowed area are suitable cells, wherein the suitable cell decision rule does not comprise a rule that the cells in the non-allowed area belong to a forbidden area; and when it is determined that the cells in the non-allowed area are the suitable cells, marking the cells in the non-allowed area as the suitable cells providing the restricted service.

8. A communication system implementing the method according to claim 1, wherein the user equipment is prevented from camping on suitable cells that do not provide normal service when suitable cells providing the normal service are available.

9. User equipment, comprising:
a processor;
a memory configured to store instructions executable by the processor;
wherein the processor is configured to perform:
when selecting a cell for camping, controlling an access stratum to determine, based on camping priorities of cells, a cell to be camped on, the camping priorities being related to service types that the cells provide; and
performing a camping operation in the cell to be camped on,
wherein the camping priorities being related to service types that the cells are able to provide comprises:
the camping priorities of suitable cells providing a restricted service are lower than the camping priorities of suitable cells providing a normal service; and
the camping priorities of suitable cells are higher than the camping priorities of acceptable cells, and
wherein the controlling an access stratum to determine, based on camping priorities of cells, a cell to be camped on, comprises:
when the suitable cells providing the normal service exist among the cells available for camping, determining a difference value between a highest signal quality corresponding to the suitable cells providing the restricted service and a highest signal quality corresponding to the suitable cells providing the normal service;
when the difference value is greater than a first strength threshold, determining a cell with the highest signal quality among the suitable cells providing the restricted service as the cell to be camped on; and
when the difference value is not greater than the first strength threshold, determining a cell with the highest signal quality among the suitable cells providing the normal service as the cell to be camped on.

10. The user equipment according to claim 9, wherein the controlling an access stratum to determine, based on camping priorities of cells, a cell to be camped on, comprises:
when the suitable cells providing the normal service exist among cells available for camping, determining a cell with a highest signal quality among the suitable cells providing the normal service as the cell to be camped on;
when the suitable cells providing the restricted service instead of the normal service exist among the cells available for camping, determining a cell with a highest signal quality among the suitable cells providing the restricted service as the cell to be camped on; and
when no suitable cell exists among the cells available for camping, selecting a cell with a highest signal quality among the acceptable cells as the cell to be camped on.

11. The user equipment according to claim 9, wherein the controlling an access stratum to determine, based on camping priorities of cells, a cell to be camped on, comprises:
determining a highest signal quality corresponding to the suitable cells providing the normal service;
when the highest signal quality corresponding to the suitable cells providing the normal service is higher than a second strength threshold, determining a cell with a highest signal quality among the suitable cells providing the normal service as the cell to be camped on;
when the highest signal quality corresponding to the suitable cells providing the normal service is not higher than the second strength threshold, determining a highest signal quality corresponding to the suitable cells providing the restricted service;
when the highest signal quality corresponding to the suitable cells providing the restricted service is higher than the second strength threshold, determining a cell with a highest signal quality among the suitable cells providing the restricted service as the cell to be camped on; and
when the highest signal quality corresponding to the suitable cells providing the restricted service is not higher than the second strength threshold, determining a cell with a highest signal quality among the suitable cells providing the normal service as the cell to be camped on.

12. The user equipment according to claim 9, wherein the processor is further configured to perform:
instructing a non-access stratum to record a non-allowed area in a forbidden area list, wherein the non-allowed area is an area in a service area in which the user equipment is not allowed to initiate a service request or a session management signaling and which is subjected to a service area restriction; and
instructing the non-access stratum to send the forbidden area list to the access stratum.

13. The user equipment according to claim 12, wherein the processor is further configured to perform:
determining, based on a suitable cell decision rule, whether cells in the non-allowed area are suitable cells, wherein the suitable cell decision rule does not comprise a rule that the cells in the non-allowed area belong to a forbidden area; and
when it is determined that the cells in the non-allowed area are the suitable cells, marking the cells in the non-allowed area as the suitable cells providing the restricted service.

14. The user equipment according to claim 9, wherein the processor is further configured to perform:
instructing a non-access stratum to establish an allowed area list or a non-allowed area list based on a service area restriction; and
instructing the non-access stratum to send the allowed area list or the non-allowed area list to the access stratum.

15. The user equipment according to claim 14, wherein the processor is further configured to perform:
determining cells in the non-allowed area based on the allowed area list or the non-allowed area list;
determining, based on a suitable cell decision rule, whether the cells in the non-allowed area are suitable cells, wherein the suitable cell decision rule does not comprise a rule that the cells in the non-allowed area belong to a forbidden area; and
when it is determined that the cells in the non-allowed area are the suitable cells, marking the cells in the non-allowed area as the suitable cells providing the restricted service.

16. A non-transitory computer-readable storage medium having stored thereon computer instructions for execution by a processor to implement operations including:

when selecting a cell for camping, controlling an access stratum to determine, based on camping priorities of cells, a cell to be camped on, the camping priorities being related to service types that the cells provide; and performing a camping operation in the cell to be camped on;

wherein the camping priorities being related to service types that the cells are able to provide comprises the following cases: the camping priorities of suitable cells providing a restricted service are lower than the camping priorities of suitable cells providing a normal service; and the camping priorities of suitable cells are higher than the camping priorities of acceptable cells, and wherein the controlling an access stratum to determine, based on camping priorities of cells, a cell to be camped on, comprises:

when the suitable cells providing the normal service exist among the cells available for camping, determining a difference value between a highest signal quality corresponding to the suitable cells providing the restricted service and a highest signal quality corresponding to the suitable cells providing the normal service;

when the difference value is greater than a first strength threshold, determining a cell with the highest signal quality among the suitable cells providing the restricted service as the cell to be camped on; and when the difference value is not greater than the first strength threshold, determining a cell with the highest signal quality among the suitable cells providing the normal service as the cell to be camped on.

* * * * *